July 17, 1934.  C. E. WYRICK  1,966,780
AUTOMATIC COMPENSATOR FOR WEAR AND LOST MOTION
Filed Nov. 18, 1929  2 Sheets-Sheet 1
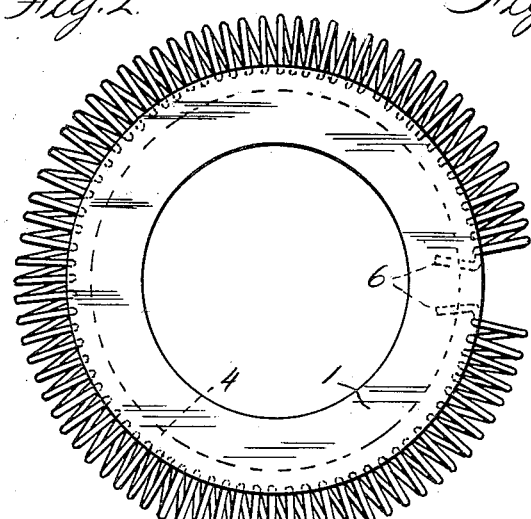
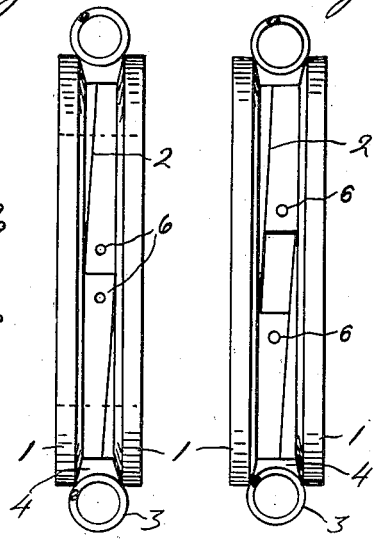
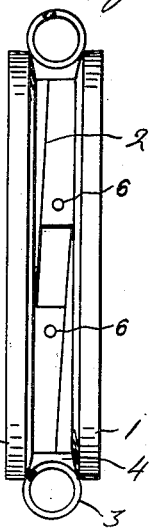
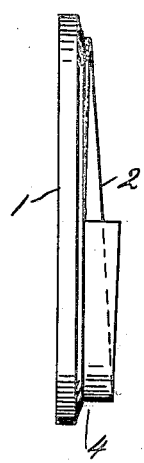
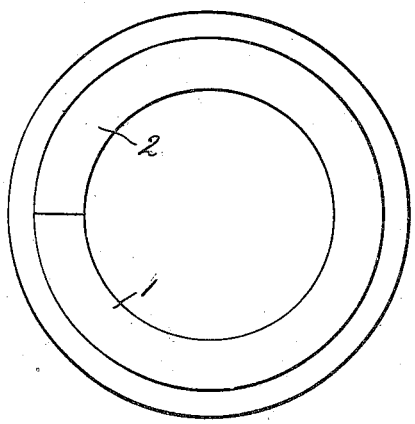
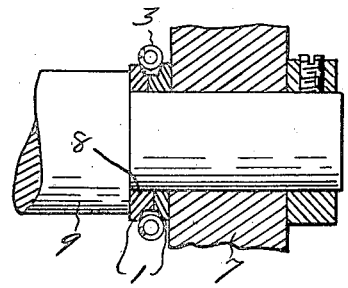
INVENTOR
Clayton E. Wyrick
BY
ATTORNEY July 17, 1934.  C. E. WYRICK  1,966,780
AUTOMATIC COMPENSATOR FOR WEAR AND LOST MOTION
Filed Nov. 18, 1929  2 Sheets-Sheet 2
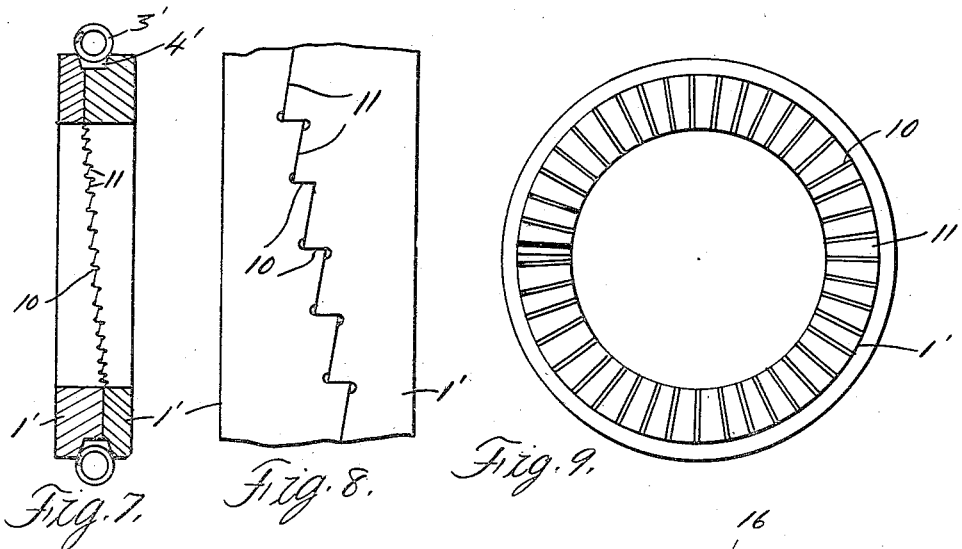
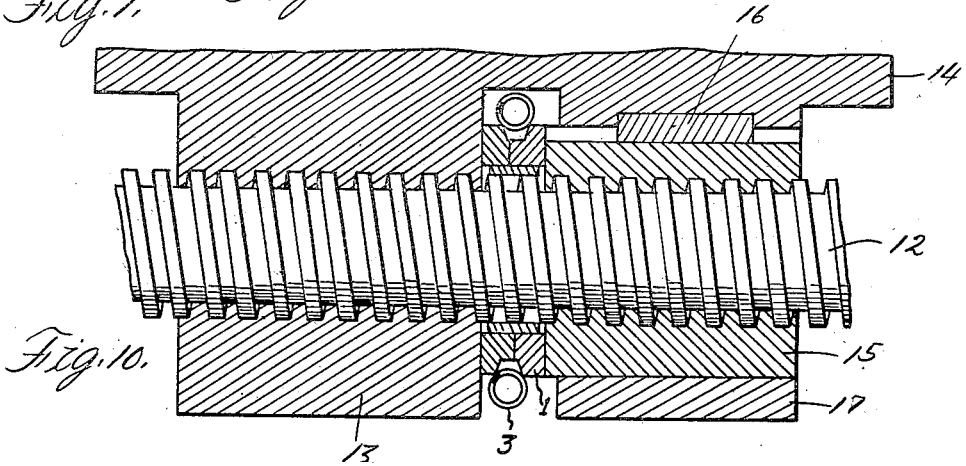
INVENTOR
Clayton E. Wyrick
ATTORNEY Patented July 17, 1934

1,966,780

UNITED STATES PATENT OFFICE 1,966,780

AUTOMATIC COMPENSATOR FOR WEAR AND LOST MOTION

Clayton E. Wyrick, Wyandotte, Mich., assignor to Wyrick Engineering Company, Wyandotte, Mich., a corporation of Michigan Application November 18, 1929, Serial No. 408,001

15 Claims. (Cl. 85—50)

This invention relates to the taking up of wear and lost motion, and particularly to automatic devices for that purpose.

An object of the invention is to provide a highly simplified unitary device for installation between two parts, subject to a more or less gradual separation due to wear or some other factor, said device comprising a pair of complementary members having engaging cam faces, and a spring connecting said members and urging them relatively along said faces, so as to expand said device and prevent play arising between said parts.

Another object is to give the cam faces of such a device the form of coaxial spirals, and to subject them to a resilient element urging them oppositely rotatively about their common axis, to increase their joint thickness as rapidly as permitted by separation of the parts spaced by said device.

A further object is to so combine said resilient member and cammed complementary members as to impose on the latter a force tending to axially separate them, as well as to a rotative force, tending to increase their joint thickness by coaction of said spiral cams.

Still another object is to provide an automatic compensator for wear and lost motion that will establish and maintain predetermined limits of maximum and minimum play between parts oppositely adjoining said compensator.

A still further object is to form the engaging cam faces of the complementary compensator members with similar series of steps, establishing maximum and minimum limits of play between parts spaced by said compensator, and to utilize a resilient element to urge said members apart so far as wear permits, and effect their travel lengthwise of the series of steps, each time that the steps of one clear those of the other.

It is also an object to provide an automatic compensator for wear and lost motion comprising a pair of complementary members having engaging cam faces each forming a series of steps, and to adapt a spring to urge said members continuously apart and exert upon them reverse rotational forces, responsive to which each member climbs the steps of the other so far as permitted by increase of the space in which the compensator is installed.

An additional object is to adapt a compensator of the described type to automatically take up wear between a feed nut and feed screw.

These and various other objects the invention attains by the construction hereinafter described and illustrated in the accomanying drawings, wherein:

Fig. 1 is a view in side elevation of the improved compensator as formed by a pair of coaxial annular members having engaged spirally cammed faces.

Fig. 2 is an edge view of said compensator, showing its approximate initial position of installation.

Fig. 3 is a view similar to Fig. 2 showing the compensator as it appears after having taken up a certain amount of wear or lost motion.

Fig. 4 is an edge view of one of said spirally cammed members.

Fig. 5 is a side view of said member.

Fig. 6 is a view showing the compensator illustrated in Figs. 1-5, installed between a bearing and a thrust-receiving shoulder of a shaft journaled in said bearing.

Fig. 7 is a view in diametrical section of a modified type of the compensator illustrated in Figs. 1-5.

Fig. 8 is a fragmentary enlargement of a portion of Fig. 7.

Fig. 9 is a side elevational view of one of a pair of members comprising the compensator shown in Figs. 7 and 8, showing the spirally stepped form of one of its faces.

Fig. 10 is a sectional view showing the compensator applied to take up lost motion between the threads of a feed screw and feed nut.

Describing the invention more in detail, and referring first to the construction illustrated in Figs. 1-6 inclusive, the reference character 1 designates a pair of duplicate substantially annular coaxial members formed with spirally cammed engaged faces 2, and jointly embraced by a coiled spring 3 urging them oppositely about their common axis and tending through coaction of said cam faces to increase their joint thickness. Said members, as illustrated, are circumferentially continuous, their spiral faces extending completely around said members. It is to be noted, however, that circumferential continuity of said members is not an essential. Preferably, the members 1 and 2 jointly form a groove 4 completely extending around their outer periphery, seating and retaining the spring 3. The ends of said spring are respectively secured to the members 1 preferably by bending said ends and inserting them in suitable radial sockets 6 in said members, as best appears in Fig. 1. Preferably, the side walls of the groove 4 are divergently inclined from the bottom of said groove, and the coils of said spring seat upon the outer edges of said walls, clearing the groove bottom, so that the contractive tension of the spring tends to spread the members 1 axially apart.

The described compensator may be installed upon any shaft, rod, or other cylindrical member to take up wear and lost motion between spaced parts. Thus, in Fig. 6, said compensator is installed to take up thrust between a bearing 7 and a shoulder 8 of a shaft 9, journaled in said bearing. As wear occurs between the bearing and said shoulder, the compensator is correspondingly increased in thickness due to rotative response of the members 1 to the spring 3, whereby longitudinal play between the shaft and its bearing is avoided.

The compensator shown in Figs. 7, 8 and 9 is similar to that already described, but in this construction the complementary annular members 1' have their adjoining faces similarly radially shouldered as indicated at 10, to form a spiral series of steps, the faces 11 between said steps having substantially spiral inclination, reverse to that of the major spiral formed by said steps. The spring 3' is applied as in the first described construction, peripherally jointly embracing the members 1' and exerting upon said members both an axial spreading force and a reverse rotational force, the latter tending to cause each of said members to climb the stepped surface of the other, so far as permitted by axial spreading of said members.

This form of compensator presents the highly desirable advantage of establishing maximum and minimum limits of play between any two spaced parts. Thus, if the desired limits are .001 and .003 of an inch, the axial extent of each shoulder 10 will be .003 of an inch, and the axial distance through which each face 11 is inclined will be .001 of an inch. Thus, as wear or some other factor permits, the force axially exerted by the spring 3' upon the members 1' (acting against the edges of the groove 4') will spread said members apart until their shoulders 10 clear each other, this travel in the assumed case being .003 of an inch. The spring 3' will then circumferentially and reversely actuate said members through a distance equal to that between the shoulders 10, whereby the inclination of the faces 11 will permit a diminution of the space interval occupied by the compensator equal to .001 of an inch, establishing this as the minimum play between the spaced parts. This limited circumferential travel will be repeated as each increment of progressive wear reaches the predetermined maximum, the complementary members thus each climbing the stepped face of the other.

In that form of the invention illustrated in Fig. 10, the compensator in either of its described forms, is applied to take up wear between a feed screw 12 and feed nut 13, the latter being rigidly carried by any desired part 14. The compensator, as shown, is installed between an end face of said nut and a companion nut 15 engaging said screw and splined, as indicated at 16, to slide in a bearing 17 rigidly mounted upon the part 14. Any play between the screw and the nut 13 is taken up continuously if the compensator shown in Figs. 1-5 is employed, and intermittently in the case of a compensator of the type shown in Figs. 7-9. In taking up such play, the compensator thrusts the nut 15 to the right, so far as permitted by wear between the screw and nut 13, whereby the two nuts are positively held in working engagement with opposite sides of the screw threads, restraining the screw from longitudinal play.

The described compensator in its various disclosed forms has a wide application to the prevention of play and lost motion in machinery and other parts. While primarily useful in effecting automatic compensation for wear, a considerably broader field of use is open to the invention.

It is a well known fact that where play is permitted between parts reciprocating under a considerable force, the resultant pounding tends to increase such play, rendering the latter rapidly accelerative. The described compensator, by taking up such play as it occurs, or definitely limiting such play, avoids this accelerative effect and consequently greatly prolongs the useful life of reciprocating parts.

It is to be noted in connection with the forms of the invention shown in Figs. 1-10 inclusive that the divergence of the side walls of the groove 4 may be suited to any particular installation, so that the axial force exerted upon the members 1 and 1' by the spring 3 or 3' may be powerful or slight, according as said walls are slightly or acutely divergent. This is particularly advantageous in utilizing the described compensator to take up wear at a thrust bearing between relatively rotative parts. In such an installation the axial thrust exerted upon the surfaces adjoining the compensator may be predetermined with substantial accuracy by selection of a spring 3 or 3' of suitable strength and by selection of a suitable angle of divergence between the walls of the groove 4 or 4'. In case the end thrust acting between said relatively rotative parts becomes abnormal, as by an expansion of one or both of said parts due to overheating, the resulting increase of friction between said parts and the complementary cammed members of the compensator, may serve to produce such a relative rotation of such members as to reduce their joint thickness, and thereby afford relief to such abnormal thrust.

It is to be understood that the depth of the groove 4 or 4' will be always such with relation to the transverse diameter of the spring 3 or 3' that the increase in width of said groove resulting from the intended maximum increase in thickness of the compensator will not allow said spring to seat upon the groove bottom. Thus maintenance of the spreading action of the spring will be assured.

While it is apparent that the illustrated embodiments of my invention are well calculated to adequately fulfill the objects and advantages primarily stated, it is to be understood that the invention is susceptible to variation, modification and change within the spirit and scope of the subjoined claims.

What I claim is:

1. A compensator for wear and lost motion comprising a pair of adjacent substantially circular members formed with coaxial engageable substantially spiral faces, and peripherally formed with a groove having divergent side walls, of a resilient element embracing said members and terminally secured to said members under a tension, urging said members rotatively to an increased joint thickness, and reacting upon said divergent walls to directly urge said members apart.

2. A compensator for wear and lost motion comprising a pair of adjacent members having engageable faces similarly shouldered to form steps, and having faces connecting said steps inclined reversely to the rise of said steps, and means for urging said members directly apart and in the direction of the rise of said steps.

3. A compensator for wear and lost motion comprising a pair of adjacent members formed with engageable surfaces radially shouldered to form spiral series of steps, said surfaces being inclined reversely to the rise of said steps and means urging said members directly apart and urging them oppositely circumferentially in the direction of the rise of said steps.

4. In a device of the character described, two members having opposed faces, and movable relatively along said faces, said faces being cammed to effect an increase in the joint thickness of said members responsive to such movement, means urging said members in such a movement and urging them separatively and means for regulating the thickness-increasing travel of said members by their separative travel.

5. In a device of the character described, the combination with a self adjusting clearance regulator, of means for automatically maintaining maximum and minimum limits of the clearance established by said regulator.

6. In a device of the character described, the combination with two adjacent members having opposed cam faces and relatively movable along said faces to increase their joint thickness, of means reacting between said members urging them in their thickness-increasing travel, means separatively urging said members, and means normally restraining said members from thickness-increasing relative travel, said means being releasable by a predetermined separative travel of said members.

7. A clearance regulator comprising two members having engageable cam faces and relatively movable along said faces to increase the joint thickness of said members, and means so regulating the relative travel of said members as to maintain maximum and minimum limits of axial play between said members.

8. A compensator for wear and lost motion comprising a pair of adjacent members having engageable faces similarly shouldered to each form a rising series of steps, and having faces connecting said steps inclined reversely to the rise of said steps, and means urging them relatively in the direction of rise of said stepped faces.

9. A compensator for wear and lost motion comprising a pair of adjacent members, formed with substantially spiral, coaxial engageable faces, said members being relatively rotative about the axis of said faces to advance each member up the spiral incline of the other and to thereby increase the joint thickness of said members, one of said members being formed with a series of shoulders, spaced about the axis of relative rotation of said members, and facing downwardly of the spiral incline of said member an element carried by the other of said members, successively engageable with said shoulders, through step-by-step relative thickness-increasing rotation of said members to positively prevent continuance of such rotation, pending separative travel of said members, adequate to release said element from said shoulders, and means urging said members relatively in the direction of rise of said spiral faces.

10. A compensator for wear and lost motion comprising a pair of adjacent members, formed with substantially spiral, coaxial engageable faces, said members being relatively rotative about the axis of said faces to advance each member up the spiral incline of the other and to thereby increase the joint thickness of said members, means urging said members relatively in the direction of rise of said spiral faces, a detent projecting from one of said members in a direction parallel to the axis of relative rotation of said members, and means engageable by said detent in predetermined positions of step-by-step relative thickness increasing rotation of said members for positively preventing such rotation pending separative travel of said detent and last mentioned means adequate to release said element from said means.

11. A compensator for wear and lost motion comprising a pair of adjacent members having engageable cam faces and relatively moveable along said faces to increase the joint thickness of said members, and formed upon said faces with similar opposed series of shoulders, interengaging in various positions of thickness-increasing relative travel of said members to positively prevent continuance of such travel, pending a separative travel of said members, adequate to disengage said shoulders, and means reacting between said members, urging them in a thickness-increasing relative travel.

12. A compensator for wear and lost motion comprising a pair of adjacent members formed with coaxial substantially spiral opposed faces, and relatively rotatively along said faces to increase the joint thickness of said members, and formed upon said faces with similar opposed series of shoulders, interengaging in various positions of thickness-increasing relative rotation of said members to positively prevent continuance of such rotation, pending a separative travel of said members adequate to disengage said shoulders, and means reacting between said members, urging them in a thickness-increasing relative rotation.

13. In a device of the character described, the combination with two members having opposed faces and relatively rotative along said faces, said faces being spirally cammed to effect an increase in the joint thickness of said members responsive to such rotation, means urging said members rotatively in a thickness-increasing travel, an arcuate series of shoulders connected to one of said members and rotative therewith, and means carried by and rotative with the other of said members, engageable with said shoulders in various positions of thickness-increasing relative rotation of said members to positively prevent continuance of such rotation, pending separation of said members adequate to disengage said shoulders and coacting means, whereby relative separative travel of said shoulders and coacting means regulates the thickness-increasing travel of said members.

14. In a device of the character described, two relatively rotative, adjacent members having opposed faces, cammed to effect an increase in the joint thickness of said members through their relative rotation, an element connecting said members elongated circumferentially of said members, and circumferentially stressed to urge said members in a thickness-increasing relative rotation, and radially stressed to urge said members separatively, and means for regulating the thickness-increasing rotation of said members by their separative travel.

15. A compensator for wear and lost motion comprising a pair of adjacent members, formed with substantially spiral, coaxial engageable faces, said members being relatively rotative about the axis of said faces to advance each member up the spiral incline of the other to increase their joint thickness, means reacting between said members, urging them in a relative, thickness-increasing rotation, a detent carried by one of said members, and a series of shoulders, said series circumferentially extending about said axis, and a detent carried by one of said members successively engageable with said shoulders, through a thickness-increasing rotation of the member carrying said detent, said shoulders being movable as a unit from the detent-carrying member to effect disengagement of the detent from any of said shoulders, whereby said detent and shoulders coact to regulate thickness-increasing relative travel of the cammed members.

CLAYTON E. WYRICK.